United States Patent
Cooper et al.

(10) Patent No.: US 11,862,771 B1
(45) Date of Patent: Jan. 2, 2024

(54) BATTERY MANAGEMENT SYSTEM WITH INTEGRATED CONTACTOR ECONOMIZER

(71) Applicant: Green Cubes Technology, LLC, Kokomo, IN (US)

(72) Inventors: Anthony Cooper, Kokomo, IN (US); Vasanth Mithilacody, Karnataka State (IN); Mohammed Alobaidi, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 565 days.

(21) Appl. No.: 15/909,273

(22) Filed: Mar. 1, 2018

Related U.S. Application Data

(60) Provisional application No. 62/465,309, filed on Mar. 1, 2017.

(51) Int. Cl.
| | | |
|---|---|---|
| *H01M 10/42* | (2006.01) | |
| *G06F 1/32* | (2019.01) | |
| *G06F 1/3203* | (2019.01) | |

(52) U.S. Cl.
CPC ........ *H01M 10/425* (2013.01); *G06F 1/3203* (2013.01); *H01M 2010/4271* (2013.01)

(58) Field of Classification Search
CPC .... G06F 1/3203; G06F 1/263; H01M 10/425; H01M 2010/4271
See application file for complete search history.

(56) References Cited

U.S. PATENT DOCUMENTS

| | | | | |
|---|---|---|---|---|
| 5,121,314 A | * | 6/1992 | Cathell | H02M 3/3376 363/17 |
| 6,212,079 B1 | * | 4/2001 | Balakrishnan | H02M 3/33507 363/21.03 |
| 6,294,904 B1 | * | 9/2001 | Hirst | G05F 1/44 323/283 |
| 6,580,260 B2 | * | 6/2003 | Takita | H02M 3/157 323/299 |
| 6,677,710 B2 | * | 1/2004 | Weedon | H05B 39/047 315/77 |
| 6,912,139 B2 | * | 6/2005 | Kernahan | H03K 19/215 363/41 |
| 8,040,117 B2 | * | 10/2011 | Telefus | H02M 1/44 323/271 |
| 8,228,027 B2 | * | 7/2012 | Gao | H02J 50/402 320/108 |
| 8,552,679 B2 | * | 10/2013 | Osinga | H02J 9/005 320/101 |
| 2005/0042451 A1 | * | 2/2005 | Arjona | H02K 3/30 428/375 |

(Continued)

*Primary Examiner* — Mohamed Charioui
*Assistant Examiner* — Lynda Dinh
(74) *Attorney, Agent, or Firm* — Reichel Stohry Dean LLP; Mark C. Reichel; Natalie J. Dean

(57) ABSTRACT

Battery management system with integrated contactor economizer. A system for reducing power consumption included herein comprises a switching mechanism comprising a switch, and a microcontroller coupled to the switching mechanism, wherein the switching mechanism is coupled to a coupling mechanism and configured to energize the coupling mechanism, and wherein the processor is configured to provides a pulse width modulated on/off signal with duty cycle ranging between 50% to 100% and frequencies between 1 KHz to 20 KHz.

12 Claims, 6 Drawing Sheets

(56) References Cited

U.S. PATENT DOCUMENTS

| | | | |
|---|---|---|---|
| 2010/0219693 A1* | 9/2010 | Azancot | H02J 50/10 307/104 |
| 2013/0076324 A1* | 3/2013 | Fujii | G05F 1/59 323/276 |
| 2015/0115736 A1* | 4/2015 | Snyder | H02J 7/0016 307/115 |
| 2017/0216602 A1* | 8/2017 | Waataja | A61N 1/36007 |

* cited by examiner

BATTERY MANAGEMENT SYSTEM WITH INTEGRATED CONTACTOR ECONOMIZER

CROSS-REFERENCE TO RELATED APPLICATIONS

The present application is related to, and claims the priority benefit of, U.S. Provisional Patent Application Ser. No. 62/465,309, filed Mar. 1, 2017, the contents of which are incorporated herein directly and by reference.

BACKGROUND

The present disclosure relates to a battery management system controlling coupling of a battery to a load through one or more contactors.

This section introduces aspects that may help facilitate a better understanding of the disclosure. Accordingly, these statements are to be read in this light and are not to be understood as admissions about what is or is not prior art.

Use of batteries is now ubiquitous in stationary applications, such as, for example, coupling to the telecommunication systems; as well as in mobile application, such as, for example, in hybrid vehicles and electric vehicles and industrial applications, e.g., forklifts and ground support equipment (GSE). A basic circuit diagram of such a battery system is illustrated in FIG. 1. The battery system includes a battery which is constructed from a plurality of cells coupled to each other in a series or parallel combination, a battery management system coupled to the battery, and one or more contactors coupled to the battery management system and to the battery. When battery cells are connected in series, each cell's voltage is additive to the next. The battery management system monitors health of the battery by checking each cell in the battery. If the battery management system confirms that all cells are operating according to an acceptable condition, the battery management system when commanded by an external control system (not shown) provides the necessary signal to the contactor block. The contactor block includes an electrical coupling mechanism that when commanded by the battery management system couples the battery to a load. Similarly, when commanded by the battery management system, the contactor block uncouples the load from the battery. In one embodiment, the contactor can be a relay including a coil that when energized closes contacts disposed between the battery and the load thereby coupling the load to the battery, as known to a person having ordinary skill in the art.

A closer look at the contactor block is provided in FIG. 2, where the contactor is provided on the high side of the battery (i.e., coupled to the positive voltage). By disengaging the contactor, the battery is uncoupled from the load, and power is thereby cutoff from the load allowing the load to power down.

The load can be mainly inductive (e.g., inductance provided by the windings of a motor in a forklift application) or mainly capacitive (e.g., a telecommunication system). In either case, an important aspect of an electric system utilizing a system as shown in FIG. 1, is to reduce operational power consumption during the operation of the contactor(s). Power is consumed when the contactor is energized and while the contactor remains energized. When the contactor is energized for long periods of time, the power consumption becomes substantial.

There is therefore an unmet need for an electric system that can reduce unwanted power consumption of a contactor when the contactor is energized and remains energized.

BRIEF SUMMARY

In an exemplary embodiment of a device for reducing power consumption of an electric coupling mechanism of the present disclosure, the device includes a pulse width modulator configured to provide a signal based on a plurality of selective pulse widths and frequencies. The device further includes a switching mechanism including a switch. The switching mechanism is coupled to the coupling mechanism and configured to energize the coupling mechanism. The pulse width modulator provides a pulse width modulated on/off signal with duty cycle ranging between 50% to 100% and frequencies between 1 KHz to 20 KHz.

In an exemplary embodiment of a system for reducing power consumption of an electric coupling mechanism of the present disclosure, the system includes a switching mechanism, including a switch. The system further includes a processor coupled to the switching mechanism. The switching mechanism is coupled to the coupling mechanism and configured to energize the coupling mechanism. The processor is configured to provide a pulse width modulated on/off signal with duty cycle ranging between 50% to 100% and frequencies between 1 KHz to 20 KHz.

In an exemplary embodiment of a method for reducing power consumption of an electric coupling mechanism of the present disclosure, the method includes the steps of energizing/de-energizing the electric coupling mechanism by a switching mechanism, including a switch. The method also includes controlling the switching mechanism by a pulse width modulator configured to provide a signal based on a plurality of selective pulse widths and frequencies. The switching mechanism is coupled to the coupling mechanism and configured to energize/de-energize the coupling mechanism. The pulse width modulator provides a pulse width modulated on/off signal with duty cycle ranging between 50% to 100% and frequencies between 1 KHz to 20 KHz.

In an exemplary embodiment of a device for reducing power consumption of an electric coupling mechanism of the present disclosure, the device comprises a pulse width modulator configured to provide a signal based on a plurality of selective pulse widths and frequencies; and a switching mechanism, including a switch, wherein the switching mechanism is coupled to the coupling mechanism and configured to energize the coupling mechanism, and wherein the pulse width modulator provides a pulse width modulated on/off signal with duty cycle ranging between 50% to 100% and frequencies between 1 KHz to 20 KHz.

In an exemplary embodiment of a device of the present disclosure, the switching mechanism is a low side driver.

In an exemplary embodiment of a device of the present disclosure, the switching mechanism includes a low-side switch coupled to the pulse width modulator via a resistive network.

In an exemplary embodiment of a device of the present disclosure, the low-side switch is a semiconductor switch.

In an exemplary embodiment of a device of the present disclosure, the semiconductor switch is an N-channel field effect transistor.

In an exemplary embodiment of a device of the present disclosure, the switching mechanism is a high side driver.

In an exemplary embodiment of a device of the present disclosure, the switching mechanism includes a high-side switch coupled to the pulse width modulator via a resistive network.

In an exemplary embodiment of a device of the present disclosure, the high-side switch is a semiconductor switch.

In an exemplary embodiment of a device of the present disclosure, the semiconductor switch is a P-channel field effect transistor.

In an exemplary embodiment of a device of the present disclosure, the semiconductor switch is an N-channel field effect transistor, the switching mechanism further comprising a boost circuit for driving the transistor.

In an exemplary embodiment of a system for reducing power consumption of an electric coupling mechanism of the present disclosure, the system comprises a switching mechanism, including a switch; and a processor coupled to the switching mechanism, wherein the switching mechanism is coupled to the coupling mechanism and configured to energize the coupling mechanism, and wherein the processor is configured to provides a pulse width modulated on/off signal with duty cycle ranging between 50% to 100% and frequencies between 1 KHz to 20 KHz. In an exemplary embodiment of a system of the present disclosure, the switching mechanism is a low side driver.

In an exemplary embodiment of a system of the present disclosure, the switching mechanism includes a low-side switch coupled to the pulse width modulator via a resistive network.

In an exemplary embodiment of a system of the present disclosure, the low-side switch is a semiconductor switch.

In an exemplary embodiment of a system of the present disclosure, the semiconductor switch is an N-channel field effect transistor.

In an exemplary embodiment of a system of the present disclosure, the switching mechanism is a high side driver.

In an exemplary embodiment of a system of the present disclosure, the switching mechanism includes a high-side system coupled to the pulse width modulator via a resistive network.

In an exemplary embodiment of a system of the present disclosure, the high-side switch is a semiconductor switch.

In an exemplary embodiment of a system of the present disclosure, the semiconductor switch is (1) a P-channel field effect transistor or (2) an N-channel field effect transistor, where the switching mechanism further comprising a boost circuit for driving the transistor.

In an exemplary embodiment of a system of the present disclosure, the processor is a microcontroller.

In an exemplary embodiment of a system of the present disclosure, the coupling mechanism comprises a coil or is in operative communication with the coil.

In an exemplary embodiment of a method for reducing power consumption of an electric coupling mechanism of the present disclosure, the method comprises energizing/de-energizing the electric coupling mechanism by a switching mechanism, including a switch, controlling the switching mechanism by a pulse width modulator configured to provide a signal based on a plurality of selective pulse widths and frequencies, wherein the switching mechanism is coupled to the coupling mechanism and configured to energize/de-energize the coupling mechanism, and wherein the pulse width modulator provides a pulse width modulated on/off signal with duty cycle ranging between 50% to 100% and frequencies between 1 KHz to 20 KHz.

In an exemplary embodiment of a method of the present disclosure, the switching mechanism is a low side driver.

In an exemplary embodiment of a method of the present disclosure, the switching mechanism includes a low-side switch coupled to the pulse width modulator via a resistive network.

In an exemplary embodiment of a method of the present disclosure, the low-side switch is a semiconductor switch.

In an exemplary embodiment of a method of the present disclosure, the semiconductor switch is an N-channel field effect transistor.

In an exemplary embodiment of a method of the present disclosure, the switching mechanism is a high side driver.

In an exemplary embodiment of a method of the present disclosure, the switching mechanism includes a high-side switch coupled to the pulse width modulator via a resistive network.

In an exemplary embodiment of a method of the present disclosure, the high-side switch is a semiconductor switch.

In an exemplary embodiment of a method of the present disclosure, the semiconductor switch is (i) a P-channel field effect transistor or (ii) an N-channel field effect transistor, where the switching mechanism further comprising a boost circuit for driving the transistor.

In an exemplary embodiment of a method of the present disclosure, the switching mechanism is controlled by a processor.

In an exemplary embodiment of a method of the present disclosure, the processor is a microcontroller.

In an exemplary embodiment of a method of the present disclosure, the method further comprises determining a minimum duty cycle of the pulse width modulated on/off signal where the contactor remains closed.

In an exemplary embodiment of a method for reducing power consumption of an electric coupling mechanism of the present disclosure, the method comprises energizing or de-energizing an electric coupling mechanism using a system, the system comprising a switching mechanism comprising a switch, and a microcontroller coupled to the switching mechanism; and controlling the switching mechanism by a pulse width modulator configured to provide a signal based on a plurality of selective pulse widths and frequencies; wherein the switching mechanism is coupled to the coupling mechanism and configured to energize/de-energize the coupling mechanism, and wherein the pulse width modulator provides a pulse width modulated on/off signal with duty cycle ranging between 50% to 100% and frequencies between 1 KHz to 20 KHz.

In an exemplary embodiment of a method of the present disclosure, the controlling step is performed to control the switching mechanism comprising a low side driver.

In an exemplary embodiment of a method of the present disclosure, the step of controlling is performed by operation of a microcontroller.

In an exemplary embodiment of a method of the present disclosure, the method further comprises determining a minimum duty cycle of the pulse width modulated on/off signal where the contactor remains closed.

In an exemplary embodiment of a system for reducing power consumption of an electric coupling mechanism of the present disclosure, the system comprises a switching mechanism comprising a switch; a microcontroller coupled to the switching mechanism; a resistive network comprising a first resistor and a second resistor, the resistive network coupled to the switching mechanism and the microcontroller; and a coupling mechanism comprising a coil; wherein the switching mechanism is coupled to the coupling mechanism and configured to energize the coupling mechanism; and wherein the processor is configured to provides a pulse width modulated on/off signal with duty cycle ranging between 50% to 100% and frequencies between 1 KHz to 20 KHz.

In an exemplary embodiment of a system for reducing power consumption of an electric coupling mechanism of the present disclosure, the system comprises a switching mechanism comprising a switch; and a microcontroller coupled to the switching mechanism; wherein the switching mechanism is coupled to a coupling mechanism and configured to energize the coupling mechanism; and wherein the processor is configured to provides a pulse width modulated on/off signal with duty cycle ranging between 50% to 100% and frequencies between 1 KHz to 20 KHz.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
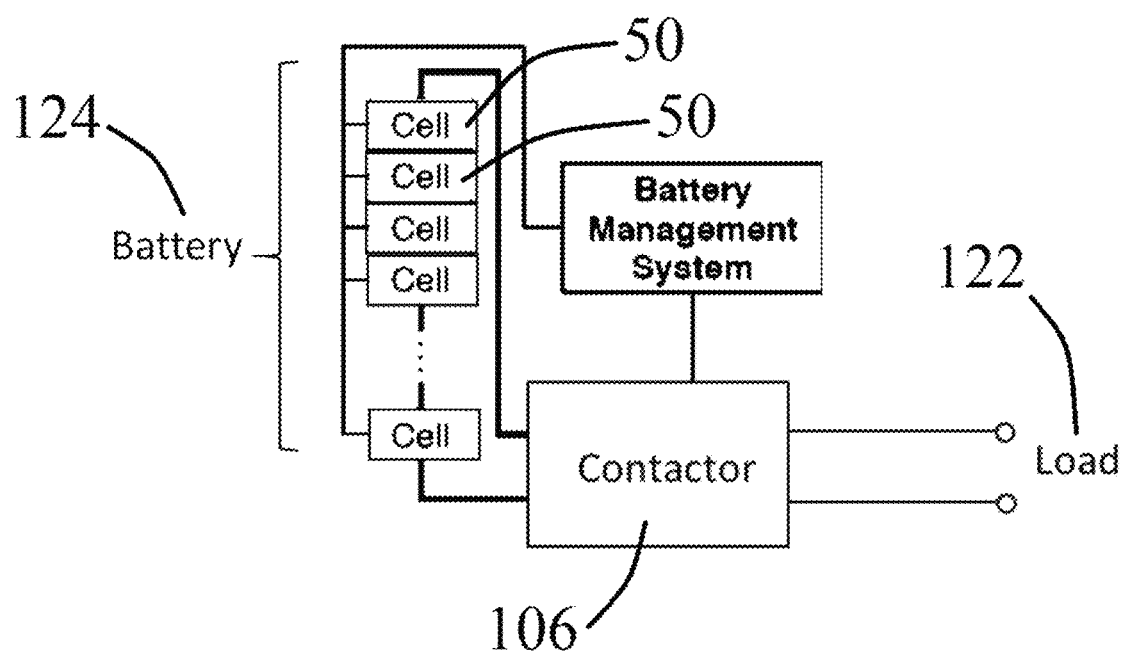
FIG. 1 shows a typical contactor connectivity in an electrical system, including a battery, a battery management system, a contactor, and a load.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A device, system, and a method are presented in the present disclosure that can reduce unwanted power consumption of a contactor when the contactor is energized.

Figure 2:
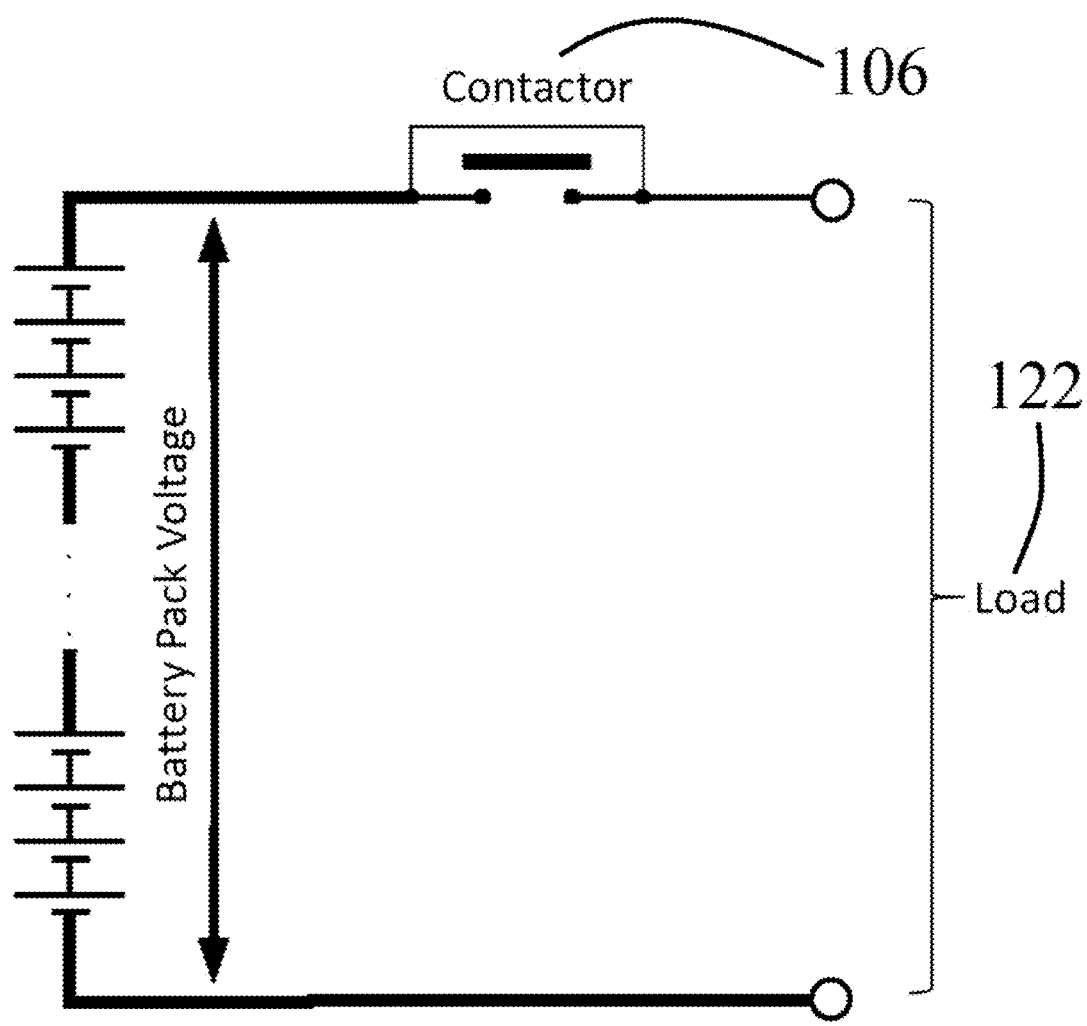
FIG. 2 shows a pair of contactors used to isolate components from the load.

The following disclosure is provided in view of the content of FIG. 1 and FIG. 2, which show a battery 124 having a plurality of cells 50, a generic battery management system, a contactor 106, and a load 122, as referenced in further detail herein. The general disclosure of FIG. 1 and FIG. 2 provides context and is related to the disclosure provided herein.

Figure 3A:
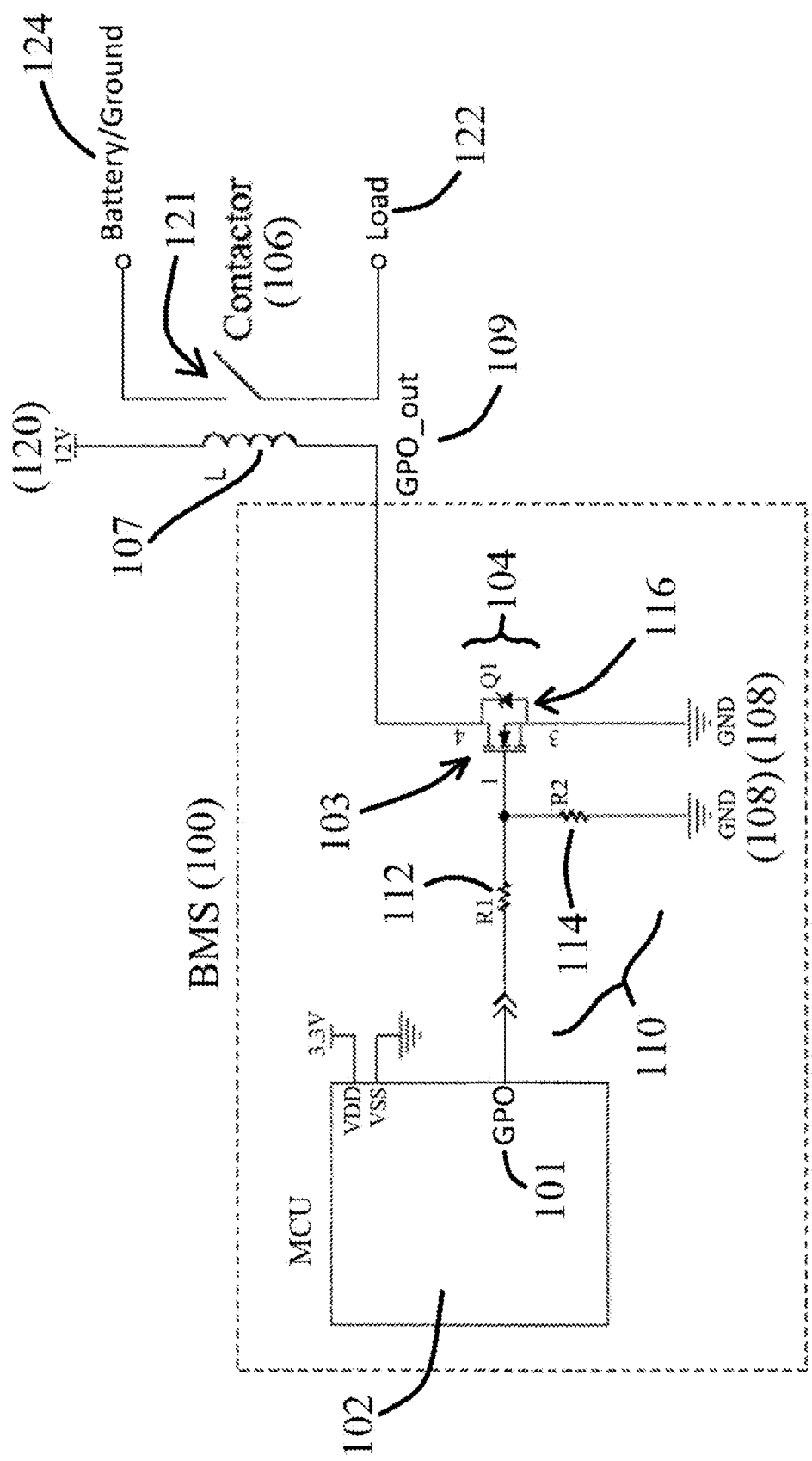
FIG. 3A and FIG. 3B show systems for reducing power consumption of the contactor including a microcontroller having a general-purpose output (GPO), a switching mechanism having an output (GPO_out), and a contactor having a coil with inductance L, according to exemplary embodiments of the present disclosure.

An exemplary battery management system (BMS) according to the present disclosure is shown in FIG. 3A. As shown in FIG. 3A, an exemplary BMS (system 100) includes a microcontroller unit (MCU, also referred to herein as a microcontroller) 102 having a general-purpose output (GPO) 101, a switching mechanism 104 coupled to the microcontroller 102 and to a contactor 106 having a coil 107 with inductance (L). A contactor 106, as provided in further detail herein, can be a relay including a coil 107 that when energized closes (or causes a coupling mechanism 121 in communication with contactor 106 and/or coil 107) contacts disposed between the battery 124 and the load 122 thereby coupling the load 122 to the battery 124.

The microcontroller 102 (e.g., ST MICROELECTRONICS STM32F105RCT7) can also be a suitable processor, as known to a person having ordinary skill in the art. In at least one embodiment, the switching mechanism 104 is a low-side driver disposed between the contactor 106 and the ground 108. The low-side driver (an exemplary switching mechanism 104), in at least one embodiment, includes a resistive network 110, including a first resistor 112 (R1) and a second resistor 114 (R2), and also includes a switch 116 (of switching mechanism 104) that is configured to couple the contactor 106 to ground 108. The switch 116 can be a semiconductor device, for example. In one embodiment, the switch 116 can be an N-channel field effect transistor (e.g., an ON SEMICONDUCTOR NCV8406ADTRKG), identified as Q1.

Figure 3B:
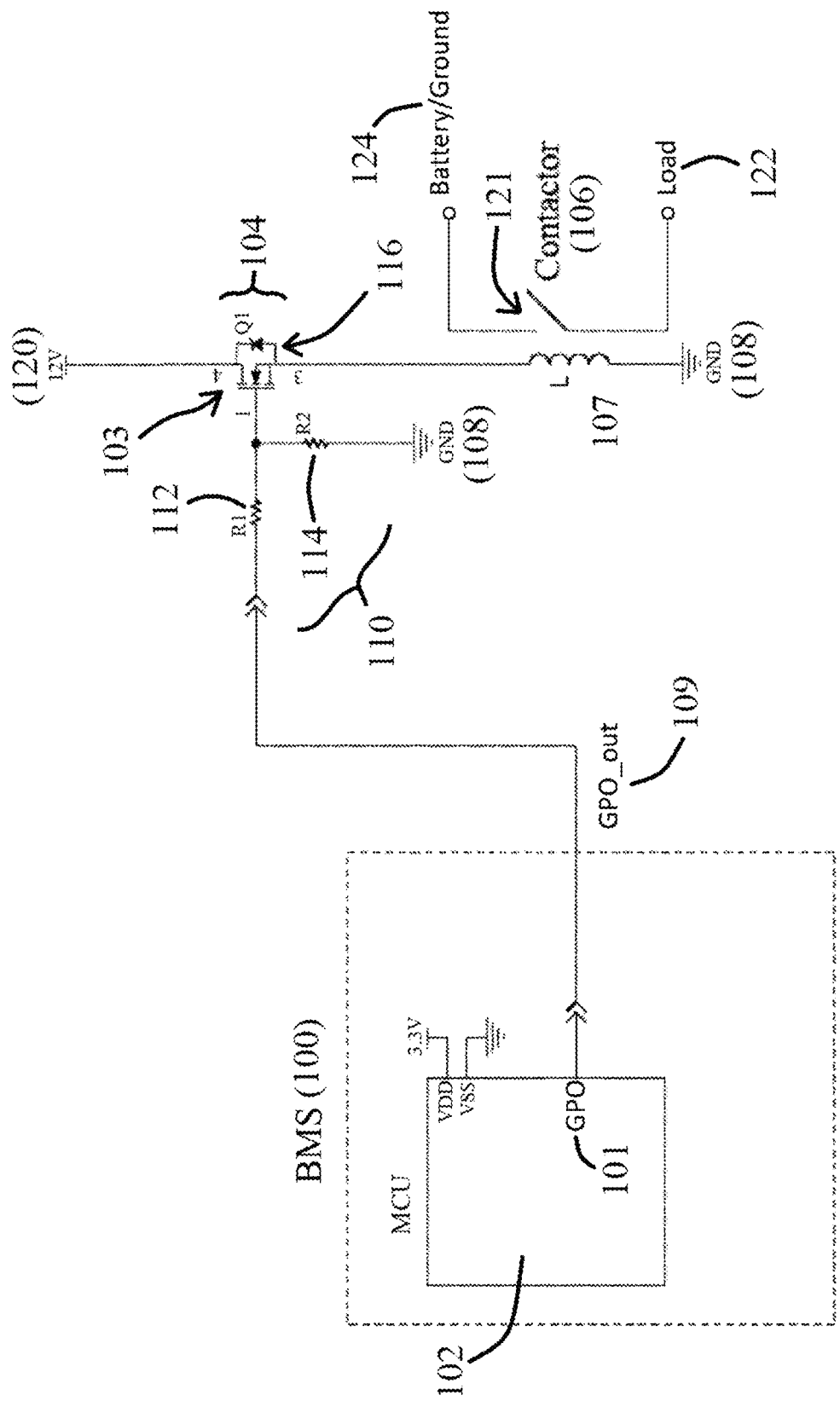

In another embodiment, such as shown in FIG. 3B, the switching mechanism 104 can be via a high-side driver disposed between the high side voltage source 120 and the contactor 106. The high-side driver includes a resistive network 110, and includes a switch 116 that is configured to couple the contactor 106 to the high side voltage 120. The switch 116 can be a semiconductor device. In one embodiment, the switch 116 can be an N-channel field effect transistor with the appropriate boost circuitry for driving the transistor with the appropriate resistive network 110, known to a person having ordinary skill in the art. In another embodiment, the switch 116 can be a P-channel field effect transistor with the appropriate resistive network 110, known to a person having ordinary skill in the art.

In order to reduce the power consumption of the contactor 106, the microcontroller 102 is configured to provide an on/off signal to the switching mechanism 104 with a selective frequency and pulse width modulation (PWM) provided by either componentry of the switching mechanism 104 or a pulse width modulator 103 in communication with the switching mechanism 104 (or otherwise associated with the switching mechanism). The frequency is selective between about 1 KHz to 20 KHz and the duty cycle of the PWM can be between about 50% to 100%, for example. Initially, the microcontroller 102 may provide a 100% duty cycle, and after a predetermined amount of time or based on inputs received from a downstream circuitry (not shown), the microcontroller 102 changes the duty cycle from 100% to a number smaller than 100%. The exact number for the duty cycle is determined based on several factors, such as the equivalent capacitance of the load 122 connected to the contactor 106, the equivalent of the inductance of the load 122 connected to the contactor 106, the resistance of the load 122 connected to the contactor 106, the temperature of the contactor 106, the condition of the cells in the battery 124, the health of the switch (Q1) 116 of switching mechanism, 104, for example, as well as other sensory input as known to a person having ordinary skill in the art.

"The microcontroller 102 is coupled to the switching mechanism 104 at a general-purpose output (identified as GPO) 101. When the GPO output is at 0V (i.e., off), the switch Q1 (116) is off and the inductor (L) of the contactor coil 107 is disconnected from ground 108, and therefore no current runs through the inductor (L) (i.e., the output identified as GPO_out 109 is at the high voltage). In this state the contactor 106 is open (i.e., load 122 is disconnected from the battery 124 in a high-side contactor arrangement as shown in FIG. 2 or FIG. 3B or the load 122 is disconnected from the ground 108 in a low-side contactor arrangement, as shown in FIG. 2 of FIG. 3A). Conversely, when the GPO output is at a high voltage (e.g., 3.3 V, i.e., on), the switch Q1 (116) turns on, allowing current to pass through the inductor (L) of coil 107, causing the GPO_out 109 to be at about zero volts (i.e., near ground). In this state the contactor 106 closes (i.e., the load 122 is connected to the battery 124 in a high-side contactor arrangement or the load 122 is connected to the ground 108 in a low-side contactor arrangement)."

Figure 4:
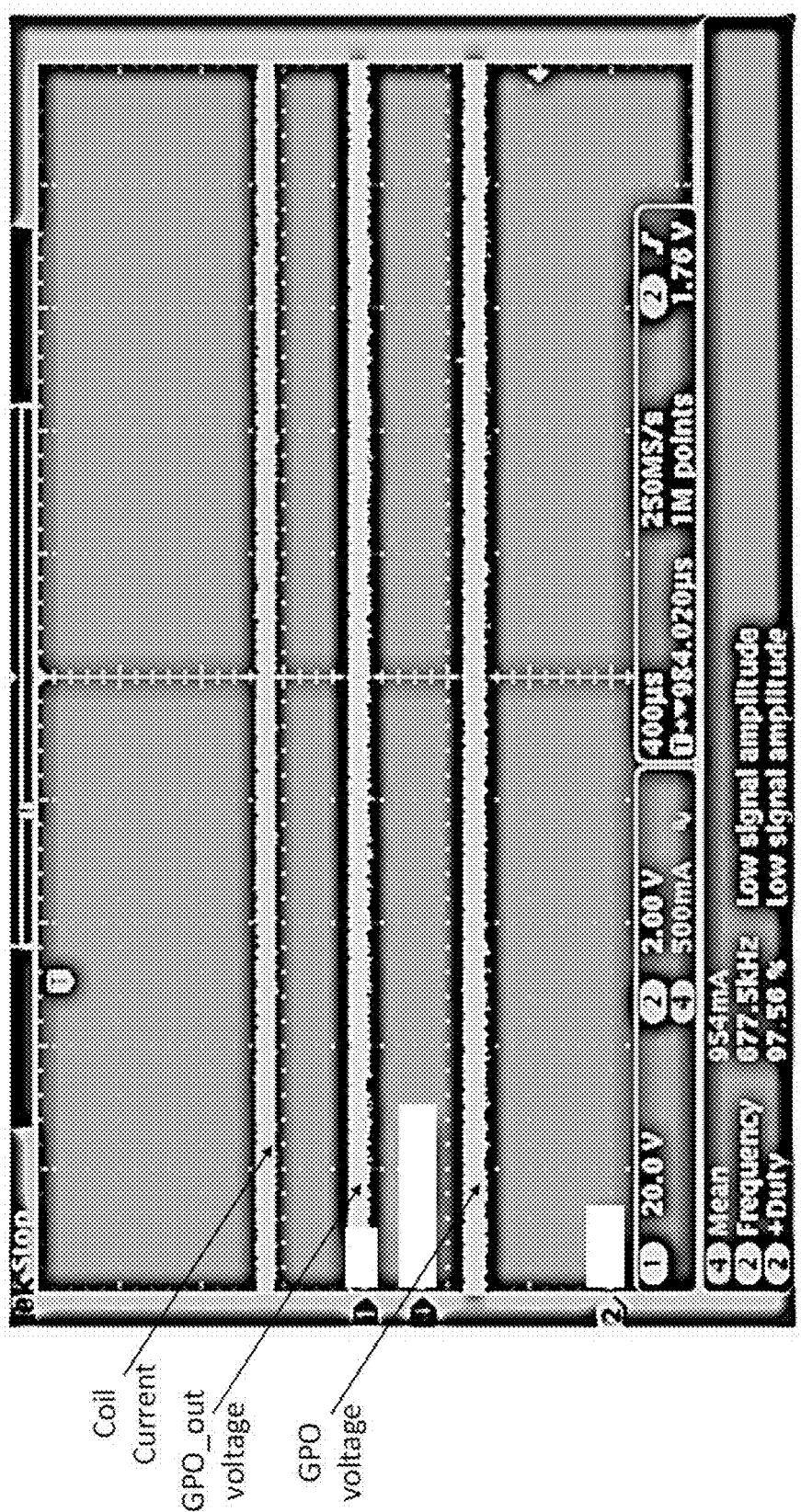
FIG. 4 shows a plot of three traces including current passing through the coil of the contactor of FIG. 3A (top trace), the voltage at the output of the switching mechanism (GPO_out) of FIG. 3A, and the voltage at the output of the general-purpose output (GPO) of the microcontroller of FIG. 3A, with the coil being energized at a pulse width modulation of about 100% duty cycle, according to an exemplary embodiment of the present disclosure.

Referring to FIG. 4, a plot of voltages and current at various positions are shown. In particular, the top trace indicates the current running through coil 107 with inductance L (in the embodiment tested the coil 107 had an inductance of about 20 mH, however, the inductance according to the present disclosure can range from 5 mH to 250 mH). The middle trace represents GPO_out 109 which is the output of the switching mechanism 104 and is connected to the contactor 106. The lower trace represents the output of the microcontroller 102 (GPO 101). The three traces shown in FIG. 4 are obtained at 100% duty cycle for a PWM signal output at GPO 101. In this configuration, the current provided to the coil 107 of the contactor 106 is about 954 mA (the equivalent of a direct current as typically implemented in the prior art approaches). At this level and at 12 V high side voltage, the power consumption is about 11.4 Watts (representing a coil resistance of about 12.6 ohms).

Figure 5:
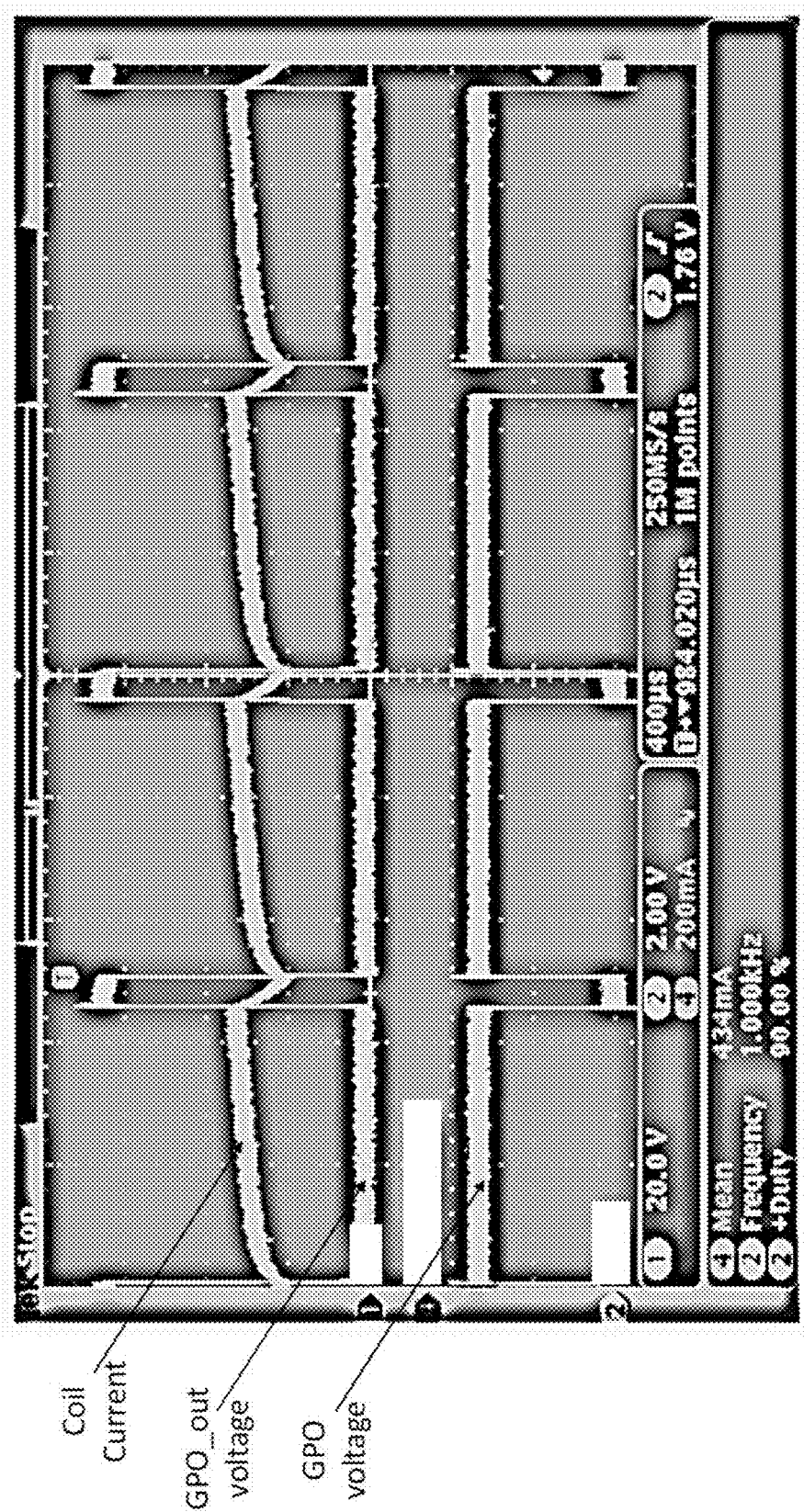
FIG. 5 shows a plot of three traces including current passing through the coil of the contactor of FIG. 3A (top trace), the voltage at the output of the switching mechanism (GPO_out) of FIG. 3A, and the voltage at the output of the general-purpose output (GPO) of the microcontroller of FIG. 3A, with the coil being energized at a pulse width modulation of about 90% duty cycle, according to an exemplary embodiment of the present disclosure.

Referring to FIG. 5, the same series of traces are shown by instead of a 100% duty cycle, the microcontroller 102 provides about 90% duty cycle at the same frequency (about 1 kHz). In this case, the average current drops to about 434 mA (representing a 5.2 W power consumption, a reduction of power consumption of about 54% as compared to the direct current approach, as seen in the prior art). It should be noted that the contactor 106 remains closed at 90% duty cycle, therefore no adverse impact (i.e., momentary disconnection of the load 122) is realized as a result of cycling the coil 107 of the contactor 106. The disconnection of the relay coil 107 generates a transient voltage peak, which is only limited by the parasitic inductivity and capacity of the electrical system. According to one embodiment, one protection method for the driver includes connecting a diode (not shown) in parallel to the relay coil 107.

According to one embodiment the optimum duty cycle is determined according to testing performed apriori and provided to the system 100 of the present disclosure as a predetermined value.

However, in another embodiment the optimum duty cycle can be measured for a selective frequency. Each system and characteristics associated therewith (i.e., contactor 106, high side voltage, etc.) are different. In one embodiment, the microcontroller 102 may be configured to upon initialization determine the optimum duty cycle by measuring voltage or current at the connectivity to the load 122 (see FIG. 3A, for example). By reducing duty cycle, at some point the contactor may momentarily open. A margin-of-safety away from that duty cycle can represent the optimum duty cycle.

While various embodiments of devices and systems for reducing unwanted power consumption of a contactor and methods for the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system for reducing power consumption, the system comprising:
    a switching mechanism comprising a switch;
    a battery management system (BMS) including a microcontroller, the microcontroller coupled to the switching mechanism and configured to provide the switching mechanism with an on or off signal, the on or off signal being a pulse width modulated (PWM) signal having both: i) a duty cycle set between 50% and 100%; and ii) a frequency set between 1 KHz and 20 KHz; and
    a resistive network comprising a first resistor and a second resistor, the resistive network coupled to the switching mechanism and the microcontroller;
    wherein the switching mechanism is coupled to a coil and a voltage source and configured to energize the coil from the voltage source while receiving the on signal;
    a coupling mechanism in communication with the coil, wherein the coupling mechanism closes to couple the load to the battery when the coil is energized;
    wherein the switching mechanism, the coil, and the voltage source are on a first circuit; and the battery, the coupling mechanism, and the load are on a second circuit isolated from the first circuit;

wherein the switching mechanism is both a semiconductor switch and a low-side switch with a N-channel field effect transistor, where the switching mechanism further comprises a boost circuit for driving the transistor;

wherein the coil is disconnected from the voltage source while the switching mechanism is receiving the off signal;

wherein when the switching mechanism receives the off signal after receiving the on signal, the coil is disconnected from the voltage source, but the coil retains a current sufficiently strong enough to keep the coupling mechanism closed so that the battery remains coupled to the load;

wherein the current in the coil falls while the switch is receiving the off signal; and wherein a value of the duty cycle and a value of the frequency of the PWM signal are set so when the switching mechanism is receiving the off signal, the coupling mechanism remains closed due to the current in the coil and the switching mechanism receives then on signal before the current in the coil is not sufficiently strong enough to keep the coupling mechanism closed, thereby energizing the coil so that the battery remains continuously coupled to the load by the coupling mechanism and there is no momentary disconnection of the load.

2. The system of claim 1, wherein the low-side switch is controlled by the pulse width modulated signal via the resistive network.

3. The system of claim 1, wherein the microcontroller is a processor.

4. The system of claim 1, wherein the coupling mechanism is in operative communication with the coil.

5. The system of claim 1, wherein the duty cycle is 90% and the frequency is about 1 kHz.

6. A method for reducing power consumption of an electric coupling mechanism, the method comprising:
energizing or de-energizing a coil using a system, the system comprising:
a switching mechanism comprising a switch,
a battery management system (BMS) comprising a microcontroller, the microcontroller coupled to the switching mechanism, and wherein the BMS provides the switching mechanism with an on or off signal, the on or off signal being a pulse width modulated (PWM) signal having both: i) a duty cycle set between 50% and 100%; and ii) a frequency set between 1 KHz and 20 KHz; and
a resistive network comprising a first resistor and a second resistor, the resistive network coupled to the switching mechanism and the microcontroller;
wherein the switching mechanism comprises both a semiconductor switch and a low side switch with a N-channel field effect transistor, where the switching mechanism further comprises a boost circuit for driving the transistor;
wherein the switching mechanism is coupled to the coil and a voltage source and configured to energize/de-energize the coil from the voltage source, wherein a coupling mechanism is in communication with the coil;
wherein the switch is closed when the switching mechanism is receiving the on signal so that the coil is energized by the voltage source thereby closing the coupling mechanism and coupling the battery to the load;
wherein the switching mechanism, the coil, and the voltage source are on a first circuit, and the battery, the coupling mechanism, and the load are on a second circuit isolated from the first circuit;

wherein the coil disconnects from the voltage source while the switching mechanism is receiving the off signal;

wherein when the switching mechanism receives the off signal after receiving the on signal, the coil is disconnected from the voltage source, but the coil retains a current sufficiently strong enough to keep the coupling mechanism closed so that the battery remains coupled to the load;

wherein the current in the coil falls while the switch is receiving the off signal; and wherein a value of the duty cycle and a value of the frequency of the PWM signal are set so when the switching mechanism is receiving the off signal, the coupling mechanism remains closed due to the current in the coil, and the switching mechanism receives the on signal before the current in the coil is not sufficiently strong enough to keep the coupling mechanism closed, thereby energizing the coil so that the battery remains continuously coupled to the load by the coupling mechanism and there is no momentary disconnection of the load.

7. The method of claim 6, further comprising the step of:
determining a minimum duty cycle of the pulse width modulated signal where the coupling mechanism remains closed;
by initially providing a 100% duty cycle and after a predetermined amount of time or based on inputs received from a downstream circuitry changing the duty cycle to a number smaller than 100%.

8. A system for reducing power consumption, the system comprising:
a switching mechanism; and
a battery management system (BMS) including a microcontroller, the microcontroller coupled to the switching mechanism and configured to provide the switching mechanism with an on or off signal, the on or off signal being a pulse width modulated (PWM) signal having both: i) a duty cycle set between 50% and 100%; and ii) a frequency set between 1 KHz and 20 KHz;
wherein the switching mechanism is coupled to a coil and a voltage source and configured to energize the coil from the voltage source while receiving the on signal, wherein a coupling mechanism is in communication with the coil and closes to couple the load to the battery when the coil is energized;
wherein the switching mechanism is via a high-side driver disposed between the voltage source and the coil;
wherein the switching mechanism, the coil, and the voltage source are on a first circuit and the battery, the coupling mechanism, and the load are on a second circuit isolated from the first circuit;
wherein the coil is disconnected from the voltage source while the switching mechanism is receiving the off signal;
wherein when the switching mechanism receives the off signal after receiving the on signal, the coil is disconnected from the voltage source, but retains a current sufficiently strong enough to keep the coupling mechanism closed so that the battery remains coupled to the load; and
wherein a value of the duty cycle and a value of the frequency of the PWM signal are set so that when the switch is receiving the off signal, the coupling mechanism remains closed due to the current in the coil and the switching mechanism receives the on signal before the current is not sufficiently strong enough to keep the coupling mechanism closed, thereby energizing the coil so that the battery remains coupled to the load by the coupling mechanism and there is no momentary disconnection of the load.

9. The system of claim 8, wherein the switching mechanism is a semiconductor switch.

10. The system of claim 9, further comprising a resistive network comprising a first resistor and a second resistor, the resistive network coupled to the switching mechanism and the microcontroller.

11. The system of claim 10, wherein the switch is controlled by the pulse width modulated signal via the resistive network.

12. The system of claim 11, wherein the switching mechanism is a N-channel field effect transistor or a P-channel field effect transistor.

* * * * *